US012676001B2

(12) United States Patent
Honda et al.

(10) Patent No.: US 12,676,001 B2
(45) Date of Patent: Jul. 7, 2026

(54) PROCESSING METHOD AND STORAGE MEDIUM STORING PROGRAM

(71) Applicants: SWOOD CO., LTD., Gifu (JP); GEOCREATES, INC., Tokyo (JP)

(72) Inventors: Tsukasa Honda, Tokyo (JP); Takayoshi Osada, Gifu (JP)

(73) Assignees: SWOOD CO., LTD., Gifu (JP); GEOCREATES, INC., Tokyo (JP)

( * ) Notice: Subject to any disclaimer, the term of this patent is extended or adjusted under 35 U.S.C. 154(b) by 241 days.

(21) Appl. No.: 18/746,330

(22) Filed: Jun. 18, 2024

(65) Prior Publication Data

US 2024/0338944 A1 Oct. 10, 2024

Related U.S. Application Data

(63) Continuation of application No. PCT/JP2022/047150, filed on Dec. 21, 2022.

(30) Foreign Application Priority Data

Dec. 28, 2021 (JP) .................................. 2021-213694

(51) Int. Cl.
　G06V 20/50 (2022.01)
　G06V 10/22 (2022.01)
　　　(Continued)

(52) U.S. Cl.
　CPC .............. G06V 20/50 (2022.01); G06V 10/22 (2022.01); G06V 10/54 (2022.01); G06V 10/56 (2022.01);
　　　(Continued)

(58) Field of Classification Search
　CPC .. G06Q 50/10; G06T 7/00; G06T 7/90; G06T 2207/20081; G06V 10/22; G06V 10/54; G06V 10/56; G06V 10/70; G06V 20/50
　See application file for complete search history.

(56) References Cited

U.S. PATENT DOCUMENTS

2009/0231146 A1　9/2009　Fujita
2010/0328492 A1* 12/2010 Fedorovskaya ........ G06Q 30/02
　　　　　　　　　　　　　　　　348/231.2

(Continued)

FOREIGN PATENT DOCUMENTS

JP　　　2010-272097　A　　12/2010
WO　　2007/029455　A1　　3/2007

OTHER PUBLICATIONS

Kuzinas et al. "The effects of image hue and semantic content on viewer's emotional self-reports, pupil size, eye movements, and skin conductance response." Psychology of Aesthetics, Creativity, and the Arts 10.3 (2016): 360. (Year: 2016).*

(Continued)

*Primary Examiner* — Katrina R Fujita
(74) *Attorney, Agent, or Firm* — Rankin, Hill & Clark LLP

(57) ABSTRACT

This information processing device has: an image acquisition unit for acquiring an analysis subject image; an image analysis unit for analyzing the analysis subject image and thereby identifying a texture and a hue in association with each of a plurality of regions in the analysis subject image; a storage unit for storing first analysis data in which a position in a reference space image, a combination of a hue and a texture at said position, and a viewer emotion about the reference space image are associated with each other; an emotion identification unit for identifying a viewing emotion of the viewer of the analysis subject space; and an output unit for outputting the viewing emotion associated with the analysis subject image.

12 Claims, 8 Drawing Sheets

(51) Int. Cl.
*G06V 10/54* (2022.01)
*G06V 10/56* (2022.01)
*G06V 10/70* (2022.01)

(52) U.S. Cl.
CPC .... *G06V 10/70* (2022.01); *G06T 2207/20081*
(2013.01)

(56) References Cited

U.S. PATENT DOCUMENTS

| | | | |
|---|---|---|---|
| 2011/0184953 A1* | 7/2011 | Joshi | G06V 10/464 |
| | | | 707/738 |
| 2014/0049546 A1* | 2/2014 | Wang | G06F 16/5854 |
| | | | 345/441 |
| 2014/0340531 A1* | 11/2014 | Jain | H04N 23/64 |
| | | | 348/207.1 |
| 2015/0213331 A1* | 7/2015 | Peng | G06F 18/22 |
| | | | 382/165 |
| 2015/0332118 A1* | 11/2015 | Wang | G06V 20/35 |
| | | | 382/203 |
| 2018/0075656 A1* | 3/2018 | Kim | G06T 19/006 |
| 2021/0132688 A1* | 5/2021 | Kim | G06N 3/0442 |
| 2025/0216934 A1* | 7/2025 | Kim | G06V 20/46 |

OTHER PUBLICATIONS

Liu et al. "Affective image classification by jointly using interpretable art features and semantic annotations." Journal of Visual Communication and Image Representation 58 (2019): 576-588. (Year: 2019).*

Moroto et al. "Estimation of emotion labels via tensor-based spatiotemporal visual attention analysis." 2019 IEEE International Conference on Image Processing (ICIP). IEEE, 2019. (Year: 2019).*

Pasupa et al. "Using image features and eye tracking device to predict human emotions towards abstract images." Image and Video Technology. Cham: Springer International Publishing, 2015. 419-430. (Year: 2015).*

Tavakoli et al. "Emotional valence recognition, analysis of salience and eye movements." 2014 22nd International Conference on Pattern Recognition. IEEE, 2014. (Year: 2014).*

Yang et al. "Visual sentiment prediction based on automatic discovery of affective regions." IEEE Transactions on Multimedia 20.9 (2018): 2513-2525. (Year: 2018).*

Yanulevskaya et al. "In the eye of the beholder: employing statistical analysis and eye tracking for analyzing abstract paintings." Proceedings of the 20th ACM international conference on multimedia. 2012. (Year: 2012).*

Zhao et al. "Predicting personalized image emotion perceptions in social networks." IEEE transactions on affective computing 9.4 (2016): 526-540. (Year: 2016).*

Zhao et al. "Exploring principles-of-art features for image emotion recognition." Proceedings of the 22nd ACM international conference on Multimedia. 2014. (Year: 2014).*

International Search Report Corresponding to International Application No. PCT/JP2022/047150, dated Feb. 14, 2023, 5 pages.

Written Opinion of the International Searching Authority Corresponding to International Application No. PCT/JP2022/047150, dated Feb. 14, 2023, 5 pages.

* cited by examiner

| POSITION (X, Y.) | HUE (R, G, B) | TEXTURE | EMOTIONS DURING VIEWING | |
| --- | --- | --- | --- | --- |
| | | | COMFORT LEVEL | AROUSAL LEVEL |
| (1, 1) | GRAY (128, 128, 128) | METALLIC | 3 | 7 |
| ⋮ | ⋮ | ⋮ | ⋮ | ⋮ |
| (2, 1) | GREEN (59, 175, 117) | BOTANICAL | 7 | 4 |
| ⋮ | ⋮ | ⋮ | ⋮ | ⋮ |
| (1, 3) | BROWN (115, 78, 48) | WOODGRAIN | 8 | 8 |

| POSITION (X, Y.) | HUE (R, G, B) | EMOTIONS DURING VIEWING | |
|---|---|---|---|
| | | COMFORT LEVEL | AROUSAL LEVEL |
| (1, 1) | GRAY (59, 175, 117) | 6 | 3 |
| ⋮ | ⋮ | ⋮ | ⋮ |
| (2, 1) | GREEN (115, 78, 48) | 7 | 7 |
| ⋮ | ⋮ | ⋮ | ⋮ |
| (1, 3) | BROWN (128, 128, 128) | 2 | 7 |

6

PROCESSING METHOD AND STORAGE MEDIUM STORING PROGRAM

CROSS-REFERENCE TO RELATED APPLICATIONS

The present application is a continuation application of International Application number PCT/JP2022/047150, filed on Dec. 21, 2022, which claims priority under 35 U.S.C § 119 (a) to Japanese Patent Application No. 2021-213694, filed on Dec. 28, 2021, contents of which are incorporated herein by reference in their entirety.

BACKGROUND OF THE INVENTION

The present disclosure relates to an information processing apparatus, an information processing method, and a storage medium storing a program for outputting information about an image indicating an atmosphere of a space. There has been known technology for calculating a green visual ratio which is an area ratio of plants such as trees in a field of view of a person's eye. Japanese Unexamined Patent Application Publication No. 2010-272097 discloses technology for calculating, as a green visual ratio, a ratio of an amount of green viewed with respect to image data representing a predetermined space.

However, even if a green visual ratio of image data is calculated, it is not possible to ascertain what impression a viewer who views a space indicated by the image data would have of the space.

BRIEF SUMMARY OF THE INVENTION

The present disclosure focuses on this point, and an object thereof is to grasp emotions of a viewer who views a space indicated by image data.

A first aspect of the present disclosure provides an information processing apparatus that includes an image acquisition part that acquires analysis target image data representing a state of an analysis target space, an image analysis part that identifies a hue and a texture in association with each of a plurality of regions of an analysis target image shown in the analysis target image data, by analyzing the analysis target image data, a storage that stores first analysis data in which i) a position of a reference space image, ii) a combination of a hue and a texture at that position, and iii) emotions of a viewer for a reference space corresponding to that reference space image are associated with each other, an emotion identification part that identifies emotions during viewing of a viewer for the analysis target space by identifying, by referring to the first analysis data, a position of the reference space image and a combination of a hue and a texture at that position whose degree of correlation with respect to a position of each of the plurality of regions identified by the image analysis part and a combination of a hue and a texture corresponding to each region is equal to or greater than a threshold value, and an output part that outputs information indicating the emotions during viewing in association with the analysis target image.

A second aspect of the present disclosure provides an information processing method, executed by a computer, that includes the steps of acquiring analysis target image data representing a state of an analysis target space, identifying a hue and a texture in association with each of a plurality of regions of an analysis target image shown in the analysis target image data by analyzing the analysis target image data, identifying emotions during viewing of a viewer for the analysis target space by identifying, in first analysis data in which a position in a reference space image, a combination of a hue and a texture at that position, and emotions of a viewer for a reference space corresponding to that reference space image are associated with each other, a position in the reference space image and a combination of a hue and a texture at that position whose degree of correlation with respect to a position of each of the plurality of regions identified and a combination of a hue and a texture corresponding to each region is equal to or greater than a threshold value, and outputting information indicating the emotions during viewing in association with the analysis target image.

A third aspect of the present disclosure provides a non-transitory storage medium storing a program for causing a computer to implement a function as an image acquisition part that acquires analysis target image data representing a state of an analysis target space, an image analysis part that identifies a hue and a texture in association with each of a plurality of regions of an analysis target image shown in the analysis target image data by analyzing the analysis target image data, an emotion identification part that identifies emotions during viewing of a viewer for the analysis target space by identifying, in first analysis data in which a position in a reference space image, a combination of a hue and a texture at that position, and emotions of a viewer for a reference space corresponding to that reference space image are associated with each other, a position in the reference space image and a combination of a hue and a texture at that position whose degree of correlation with respect to a position of each of the plurality of regions identified by the image analysis part and a combination of a hue and a texture corresponding to each region is equal to or greater than a threshold value, and an output part that outputs information indicating the emotions during viewing in association with the analysis target image.

DETAILED DESCRIPTION OF THE INVENTION

Hereinafter, the present disclosure will be described through exemplary embodiments of the present disclosure, but the following exemplary embodiments do not limit the disclosure according to the claims, and not all of the combinations of features described in the exemplary embodiments are necessarily essential to the solution means of the disclosure.

Figure 1:
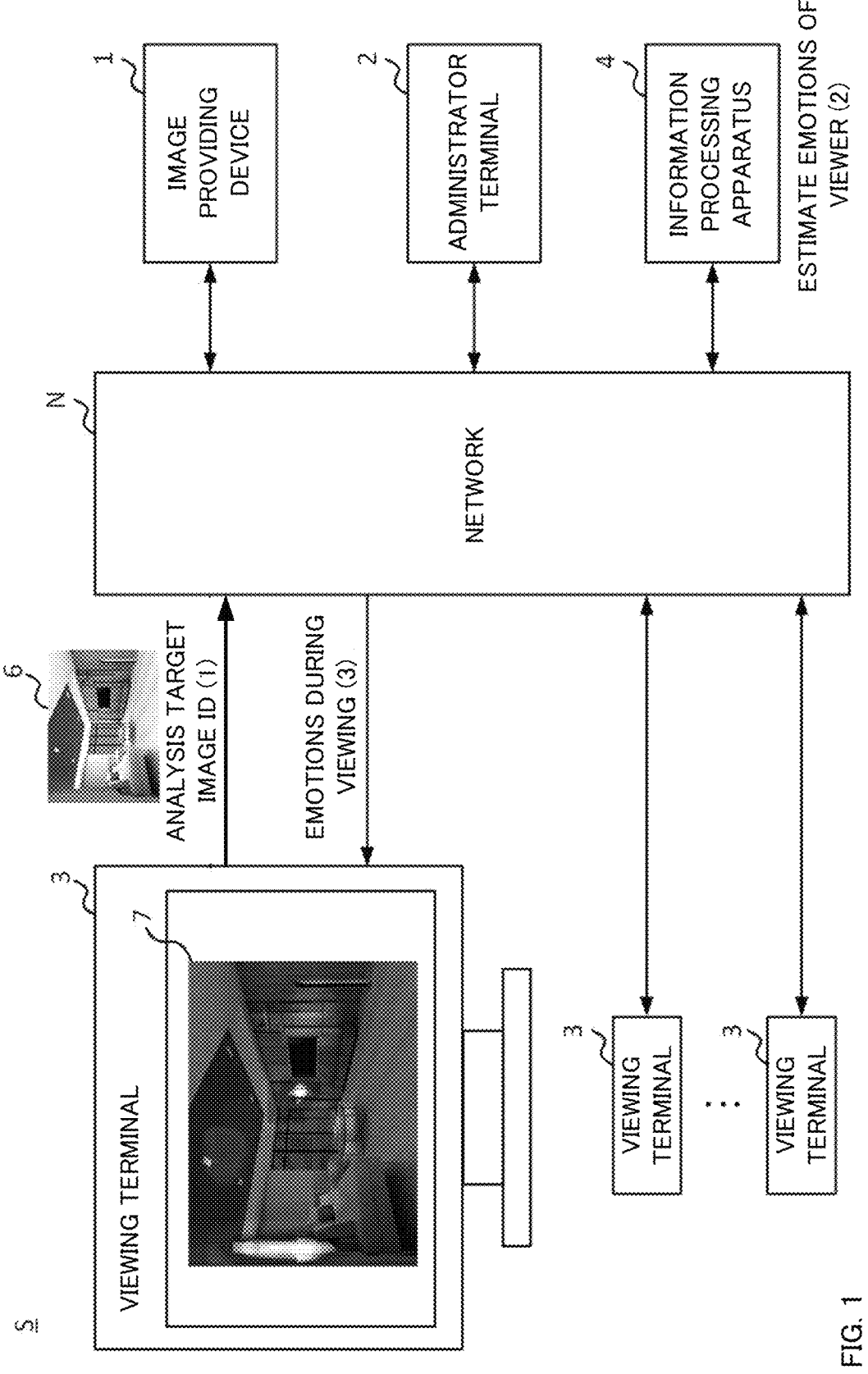
FIG. 1 illustrates an overview of an information processing system.

[Overview of information processing system S] FIG. 1 illustrates an overview of an information processing system S. The information processing system S is a system that provides a user with information indicating emotions estimated to be experienced by a viewer who views a predetermined space. The user is a designer or an architect who designs a house, an office, a store, a park, a garden, a theme park, or the like, for example. The viewer is a person who is expected to use a dwelling or facility designed by the user, for example. The predetermined space is referred to as an analysis target space in the following.

The emotions experienced by the viewer who views the analysis target space (referred to as "emotions during viewing") differ between a case where the analysis target space contains plants and wood and a case where the analysis target space contains metals and concrete. In other words, the emotions during viewing varies according to a hue and a surface texture (that is, texture) of an object included in the analysis target space. The information processing system S therefore estimates the emotions during viewing on the basis of a combination of the hue and the texture in the analysis target space as shown in an analysis target image viewed by the viewer, a viewed position in the analysis target space, or the like.

The information processing system S includes an image providing device 1, an administrator terminal 2, a viewing terminal 3, and an information processing apparatus 4. The image providing device 1, the administrator terminal 2, the viewing terminal 3, and the information processing apparatus 4 transmit and receive various types of data via a network N such as the Internet.

The analysis target image representing a state of the analysis target space is, for example, i) an image for implementing a preliminary inspection for purchasing or renting real estate, such as a house or an office, ii) an image showing a space such as a store where products are sold or a showroom or the like where products are purchased, or iii) an image showing a space for experiencing a service, such as a tourist site, an amusement park, a museum, or the like. The analysis target image may be an image of an indoor space or an image of an outdoor space. It should be noted that the analysis target image may be a virtual reality image (VR image) generated by actually capturing an outdoor space or a space inside a building or an image generated using computer graphics technology, for example.

The image providing device 1 is a server that stores one or more pieces of analysis target image data to be viewed by the viewer who uses the information processing system S. The image providing device 1 is managed by an operator of a design office, a model home park, a real-estate company, or a store selling products, for example.

The image providing device 1 provides one or more analysis target images to the viewing terminal 3 in such a manner that the viewer can view the analysis target image. The image providing device 1 may identify the analysis target image selected by the viewer after displaying thumbnail images of the plurality of analysis target images on the viewing terminal 3. The image providing device 1 may acquire, from the viewing terminal 3, information indicating a position designated by the viewer on the viewing terminal 3.

The administrator terminal 2 is a computer used by an administrator who manages the image providing device 1 or the plurality of analysis target images. The administrator terminal 2 uploads the plurality of analysis target images stored by the administrator to the image providing device 1 via the network N. The viewing terminal 3 may function as the administrator terminal 2, and the user using the administrator terminal 2 may upload the analysis target image to the image providing device 1.

The viewing terminal 3 is a terminal used by the viewer to view the one or more analysis target images and to display the emotions during viewing for the analysis target space, and is a computer, a smartphone, or a tablet, for example. The viewing terminal 3 may be a terminal owned by the viewer, or may be a terminal installed in a design office, a real-estate company, a model home park, or a store. The viewing terminal 3 receives the analysis target image data representing the analysis target image from the image providing device 1, and displays the analysis target image on the display on the basis of the received analysis target image data. The user who has the viewer viewing the analysis target image may use the viewing terminal 3 together with the viewer.

When the viewer or the user performs a predetermined operation on the viewing terminal 3, the viewing terminal 3 displays the one or more analysis target images which can be selected by the viewer. For example, when the viewer selects one of the plurality of analysis target images, the viewing terminal 3 displays an analysis target image 6 that has been selected. The viewing terminal 3 may display the analysis target images one by one, and switch the analysis target image displayed when the viewer selects an icon for switching the analysis target image displayed. If the analysis target image is an image captured by an omni-directional camera, for example, the viewing terminal 3 may change a viewing direction corresponding to the analysis target image displayed, on the basis of an operation of the viewer.

For example, the viewing terminal 3 transmits, to the information processing apparatus 4, analysis target image identification information (referred to as an "analysis target image ID" below) for identifying one or more analysis target images selected by the viewer from the plurality of analysis target images (see FIG. 1(1)). It should be noted that the viewing terminal 3 may transmit, as the analysis target image, a captured image, captured on the basis of an operation of the viewer, to the information processing apparatus 4. Further, the viewing terminal 3 may transmit, as the analysis target image, a CG image of i) an indoor space such as a house, an office, a store, or the like and ii) a facility such as a park, a garden, a theme park, or the like generated using computer graphics technology.

The information processing apparatus 4 is a computer that identifies the emotions during viewing when the viewer views the analysis target space shown in the analysis target image 6 identified by the analysis target image ID received from the viewing terminal 3. The information processing apparatus 4 estimates the emotions during viewing on the basis of the combination of the hue and the texture in the analysis target space shown in the analysis target image 6 (see FIG. 1(2)).

The information processing apparatus 4 then transmits, as information indicating the identified emotions during viewing, a heat map 7 indicating the strength of the emotions during viewing to the viewing terminal 3, for example (see FIG. 1(3). The viewing terminal 3 displays the analysis target image 6 on the display with the heat map 7 overlayed thereon. In this manner, the user or the viewer can grasp the emotions during viewing of the viewer viewing the analysis target space. The following description will mainly exemplify an operation when the information processing apparatus 4 transmits the emotions during viewing to the viewing terminal 3.

[Configuration of Information Processing Apparatus 4]

Figure 2:
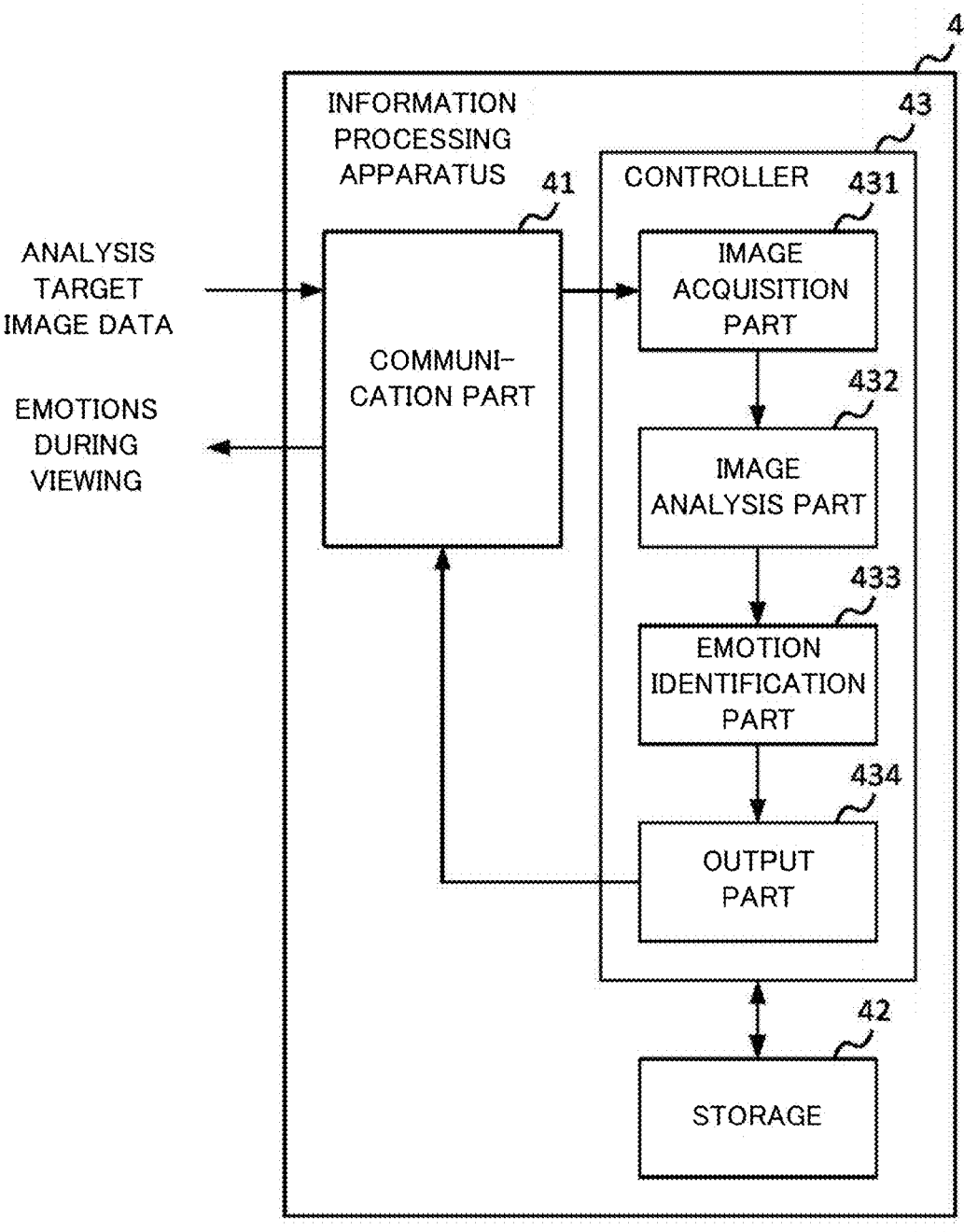
FIG. 2 shows a configuration of an information processing apparatus.

FIG. 2 shows a configuration of the information processing apparatus 4. The information processing apparatus 4 includes a communication part 41, a storage 42, and a controller 43. The controller 43 includes an image acquisition part 431, an image analysis part 432, an emotion identification part 433, and an output part 434.

The communication part 41 includes a communication interface for transmitting and receiving data to and from the image providing device 1, the administrator terminal 2, or the viewing terminal 3 via the network N. The communication part 41 inputs, to the image acquisition part 431, i) the analysis target image data received from the image providing device 1 and ii) the analysis target image ID, viewing state information, or biological information received from the viewing terminal 3. Further, the communication part 41 transmits information indicating the emotions during viewing inputted from the output part 434 to the viewing terminal 3.

The storage 42 includes a storage medium such as a Read Only Memory (ROM), a Random Access Memory (RAM), and a hard disk. The storage 42 stores the analysis target image data received from the image providing device 1 in association with the analysis target image ID for identifying the analysis target image data. Further, the storage 42 stores a program executed by the controller 43.

The storage 42 stores first analysis data used to identify the emotions during viewing of the viewer for the analysis target space. In the first analysis data, i) a position in the reference space image, ii) the combination of the hue and the texture at that position, and iii) the emotions of the viewer (emotions during viewing) for the reference space corresponding to that reference space image are associated with each other.

Figures 3, 4:
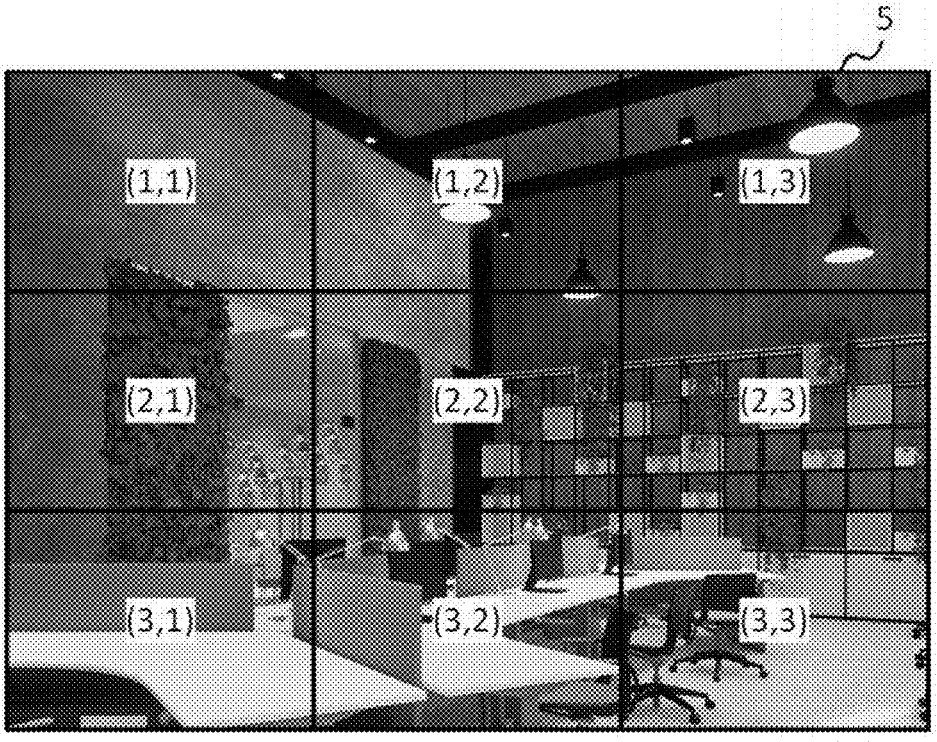
FIG. 3 shows an example of an image of a reference space.
FIG. 4 shows an example of first analysis data.

FIG. 3 shows an example of an image of a reference space image 5. The reference space image 5 shown in FIG. 3 is divided into a plurality of regions. The reference space image 5 of the present embodiment is divided into nine regions, made up of three rows and three columns. A position of each region is represented by two-dimensional coordinates indicating a position of a row (X) and a position of a column (Y), for example. Specifically, the positions of the respective regions are set as (1,1), (1,2), (1,3), (2,1), (2,2), (2,3), (3,1), (3,2), and (3,3), starting from the top left and moving to the bottom right. It should be noted that a method for dividing the reference space image 5 is not limited to the above-mentioned method, and the reference space image 5 can be divided into any number and arrangement of regions. The size of each region is also arbitrary.

FIG. 4 shows an example of the first analysis data. In the first analysis data, i) each region in the reference space, ii) the hue and the texture at that region, and iii) the emotions during viewing for that region are associated with each other. In the first analysis data, i) a position of the reference space viewed by the viewer and ii) the emotions during viewing of the viewer when viewing that position may be associated with each other.

A hue is an indicator of differences in color aspect. The hue is represented by an RGB color space using three primary colors of Red (R), Green (G), and Blue (B), for example. The hue may be represented using an HSV color space or an HLS color space.

A texture is an indicator of a surface texture, feel, and the like of an object. The indicator of the surface texture of the object includes, but is not limited to, "botanical," "woodgrain," and "metallic." The indicators of the surface texture may be smoothness or surface roughness, which are each a measure of an unevenness of a surface of an object, or may indicate a design or pattern appearing on the surface.

The "emotions during viewing" are an indicator of emotions experienced by the viewer who views the reference space represented by the reference space image 5. The emotions of the viewer when viewing the reference space are measured in advance by experiment. The emotions of the viewer are measured on the basis of a physiological state of the viewer involving at least one of brain waves or heartbeats of the viewer who views a predetermined position of the reference space, for example. The emotions of the viewer are indicated by a comfort level and an arousal level using the Russell circle model, for example. By way of example, regarding the viewer's emotions, the greater the amount of a-waves in the brain waves of the viewer viewing the reference space, the more relaxed and comfortable the viewer viewing the reference space is estimated to be (that is, the viewer's comfort level is higher). Further, regarding the viewer's emotions, the greater the amount of B-waves in the brain waves of the viewer viewing the reference space, the more focused the viewer viewing the reference space is estimated to be (that is, the arousal level of the viewer is higher).

As a specific example, the first analysis data shown in FIG. 4 indicates that the hue at the position [2,1] of the reference space image is [green (59, 175, 117)] and the texture is [botanical]. The first analysis data indicates that the comfort level is [7] and the arousal level is [4], as the emotions experienced by the viewer viewing the position [2,1] of the reference space image. In other words, it is indicated that the emotions of the viewer viewing the space of the [botanical] position [2, 1] with [green (59, 175, 117)] is in (the relaxed state) whose comfort level is [7] and arousal level is [4].

The storage 42 may store the viewer's emotions in association with each of the plurality of reference space images. The storage 42 may store the viewer's emotions in association with the plurality of positions for each reference space image respectively.

The storage 42 may store a machine learning model as the first analysis data. For example, a first learning model, which is the first analysis data, is a model generated by executing known machine learning processing using a plurality of reference space images. Specifically, the first learning model is a model that outputs the emotions during viewing of a viewer viewing the reference space image, when a position of the reference space image and the combination of the hue and the texture at that position are inputted. That is, in the first learning model, the position of the reference space image and the combination of the hue and the texture at that position are explanatory variables, and the emotions during viewing are target variables. The information processing apparatus 4 uses the first learning model to predict the emotions during viewing from the position and the combination of the hue and the texture at that position. The learning model is a neural network, for example. The machine learning processing is backpropagation, for example.

It should be noted that the emotions that the viewer experiences when the viewer views an object in a state where the color and the surface texture of the object are perceived differ from the emotions that the viewer experiences when the viewer views the object in a state where only the color is perceived, without perceiving the texture of the object. Therefore, the storage 42 stores second analysis data that is associated with the position in the reference space image, the hue at that position, and the emotion of the viewer for the reference space image.

Figures 5, 6:
FIG. 5 shows an example of second analysis data.
FIG. 6 is an example of an analysis target image.

FIG. 5 shows an example of the second analysis data. Unlike the first analysis data, the texture is not associated with the position of the reference space image and the emotions during viewing in the second analysis data. As a specific example, the emotions during viewing for the position (2, 1) in the second analysis data indicate the comfort level [7] and the arousal level [7], which is different from the emotions during viewing in the first analysis data indicating the comfort level [7] and the arousal level [4] (see FIG. 4).

It should be noted that the second analysis data may be a learning model as well as the first analysis data. In this case, a second learning model for the second analysis data is a model that outputs the emotions during viewing for the reference space image, when a position of the reference space image and the hue at that position are inputted. That is, in the second learning model, the position of the reference space image and the hue at that position are explanatory variables, and the emotions during viewing are target variables.

The controller 43 is a Central Processing Unit (CPU), for example. The controller 43 functions as the image acquisition part 431, the image analysis part 432, the emotion identification part 433, and the output part 434 by executing the program stored in the storage 42.

The image acquisition part 431 acquires various kinds of information received by the communication part 41. The image acquisition part 431 acquires the analysis target image data representing states of one or more analysis target spaces selected by the user or the viewer. Specifically, the image acquisition part 431 acquires the analysis target image data corresponding to the analysis target image ID transmitted by the viewing terminal 3. FIG. 6 shows an example of the analysis target image 6.

The image acquisition part 431 inputs the analysis target image data identified by the acquired analysis target image ID to the image analysis part 432. Specifically, the image acquisition part 431 acquires the analysis target image data identified by the acquired analysis target image ID from the image providing device 1, and inputs the acquired analysis target image data to the image analysis part 432. When the viewing terminal 3 transmits a plurality of analysis target image IDs, the image acquisition part 431 acquires a plurality of pieces of analysis target image data respectively corresponding to the analysis target image IDs from the image providing device 1, and inputs the acquired plurality of pieces of analysis target image data to the image analysis part 432.

The image analysis part 432 identifies the hue and the texture in the analysis target space shown in the analysis target image 6 by analyzing the analysis target image data. For example, the image analysis part 432 identifies the hue and the texture in association with each of a plurality of regions of the analysis target image 6 represented by the analysis target image data.

Figure 7:
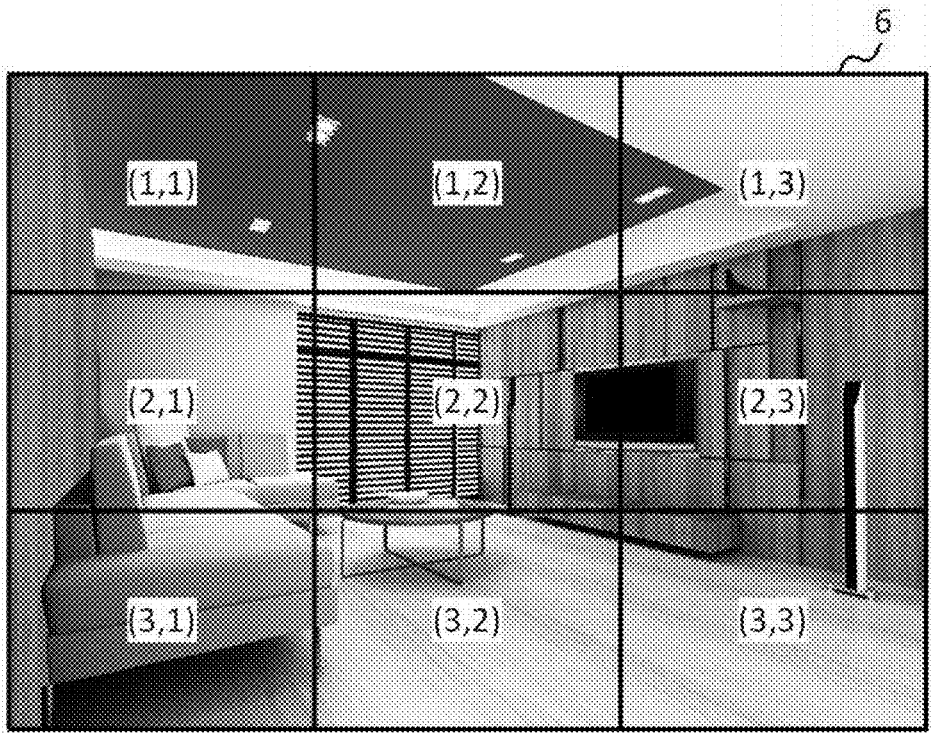
FIG. 7 illustrates a process of identifying hues and textures of a plurality of regions.

FIG. 7 illustrates a process of identifying the hues and the textures at the plurality of regions. As shown in FIG. 7, the analysis target image 6 is divided into nine regions, made up of three rows and three columns. The nine regions are identified with identification information for locating them, starting from the top left and moving to the bottom right. The identification information for identifying the positions is set as (1,1), (1,2), (1,3), (2,1), (2,2), (2,3), (3,1), (3,2), and (3,3), starting from the top left and moving to the bottom right, for example.

The image analysis part 432 identifies the hue of each region. For example, the image analysis part 432 identifies the hue of each of a plurality of pixels included in each region, and identifies the mean or the median of the hues of the plurality of pixels as the hue of the region. For example, the image analysis part 432 identifies the mean of the hues of the plurality of pixels included in the region at the position (1, 1) as the hue of the region.

The image analysis part 432 identifies the texture of each region. The image analysis part 432 identifies the texture of each region by extracting features of each region using, for example, a plurality of mask patterns. It should be noted that the processing by which the image analysis part 432 identifies the texture is not limited to the above-described process.

The emotion identification part 433 identifies the emotions during viewing of the viewer viewing the analysis target space. Specifically, the emotion identification part 433 first identifies, by referring to the first analysis data, a degree of correlation between i) a position of each region in the analysis target space image and the combination of the hue and the texture at that position and ii) a position of each region in the reference space image 5 and the combination of the hue and the texture at that position. The emotion identification part 433 then identifies, as the emotions during viewing of the viewer for the analysis target space, the emotions during viewing corresponding to the position in the reference space image and the combination of the hue and the texture at that position whose degree of correlation is equal to or greater than a threshold value. The threshold value of the degree of correlation is determined in advance by experiment or the like.

As a specific example, the emotion identification part 433 identifies a region, in the analysis target image 6, whose degree of correlation with respect to the combination of the hue [brown] and the texture [woodgrain] at the position (1,3) of the reference space image 5 is equal to or greater than the threshold value. If the hue is [brown] at the position (2,3) of the analysis target image 6 and the texture thereat is [woodgrain], the emotion identification part 433 determines that the degree of correlation between the region of the position (1,3) of the reference space image 5 and the region of the position (2,3) of the analysis target image 6 is equal to or greater than the threshold value. The emotion identification part 433 then identifies the emotions during viewing for the region at the position (2,3) of the analysis target image 6 as the emotions during viewing (the comfort level [8] and the arousal level [8]) corresponding to the position (1,3) of the reference space image 5 (see FIG. 4).

If the first analysis data is a learning model, the emotion identification part 433 identifies the emotions during viewing for the analysis target space corresponding to the analysis target space image by inputting the analysis target space image to the learning model. Specifically, the emotion identification part 433 inputs the position of each region in the analysis target space image and the combination of the hue and the texture at that position to the learning model, thereby identifying the emotions during viewing for the analysis target space corresponding to the analysis target space image. In this manner, the emotion identification part 433 can identify the emotions during viewing more accurately by using the learning model that identifies the emotions during viewing by having the combination of the hue and the texture being inputted.

The emotion identification part 433 may identify the emotions of the viewer for each position viewed of the analysis target space. For example, the emotion identification part 433 identifies the emotions during viewing of the viewer in association with the position viewed of the analysis target space by referring to the first analysis data. Specifically, the emotion identification part 433 identifies the emotions during viewing of the viewer for each of the positions viewed, on the assumption that the viewer views each position of the analysis target space. As a specific example, the emotion identification part 433 identifies the emotions during viewing in association with the position (1,1) of the analysis target image 6 assuming that the viewer views the position (1,1) of the analysis target image 6. In this manner, the emotion identification part 433 can identify the emotions assumed to be experienced when the viewer who is expected to use a dwelling or facility designed by the user views a predetermined position of the analysis target space.

Further, the emotion identification part 433 may identify the position viewed by the viewer of the analysis space image corresponding to the analysis target space, and identify the emotions during viewing in association with the identified position viewed. For example, while the viewer is wearing goggles including a camera for capturing the viewer's eyes and a display for displaying the analysis target image, the emotion identification part 433 identifies the position viewed on the basis of the analysis target image displayed on the display and positions of the viewer's pupils. The emotion identification part 433 then identifies the emotions during viewing for the identified position viewed. In this manner, the emotion identification part 433 can identify the emotions assumed to be experienced when the viewer views the position viewed of the image.

The emotion identification part 433 identifies the emotions during viewing according to a depth of the analysis target space. For example, the emotion identification part 433 identifies the emotions during viewing on the basis of the combination of the hue and the texture at a region in the analysis target space closer to the viewer, and identifies the emotions during viewing only on the basis of the hue in a region farther from the viewer. In this case, the analysis target image data includes depth information associated with a pixel. In other words, the depth information is associated with each pixel included in the analysis target image data. The depth is a numerical value indicating the position in a depth direction of the analysis target space, for example, and the larger the numerical value, the farther from the viewer the region in the analysis target space that pixel represents.

The emotion identification part 433 defines a region whose depth indicated by the depth information is less than a depth threshold value, which distinguishes the region closer to the viewer from the region farther from the viewer, as the first region, which is the region in the analysis target space closer to the viewer. The emotion identification part 433 determines a region whose depth indicated by the depth information is equal to or greater than the depth threshold value as a second region different from the first region. The depth threshold value is an intermediate value between the maximum value and the minimum value of the depth indicated by the depth information of each pixel included in the analysis target image data, for example, but is not limited to this value.

Figure 8:
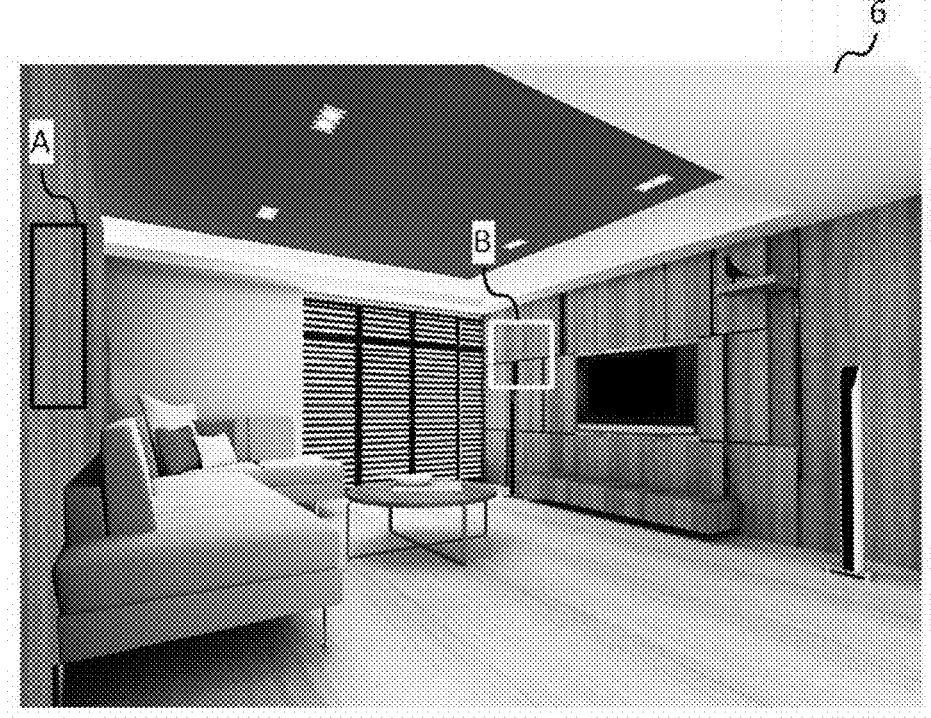
FIG. 8 illustrates a first region and a second region in the analysis target image.

FIG. 8 illustrates a first region A and a second region B in the analysis target image 6. The first region A shown in FIG. 8 is a region including only pixels whose depths are less than the depth threshold value. The second region B is a region including only pixels whose depths are equal to or greater than the depth threshold value. That is, the first region A of the analysis target image 6 is positioned closer to the viewer than the second region B.

With respect to the first region A, the emotion identification part 433 refers to the first analysis data to identify first emotions of the viewer for the analysis target image on the basis of a relationship between the position of the first region A and the combination of the hue and the texture corresponding to the first region A. For example, the emotion identification part 433 identifies the first emotions of the viewer for the analysis target image by inputting the position of the first region A and the combination of the hue and texture at the first region A to the first learning model.

With respect to the second region B, the emotion identification part 433 refers to the second analysis data to identify second emotions of the viewer for the analysis target image 6 on the basis of a relationship between the position of the second region B and the hue corresponding to the second region B.

The emotion identification part 433 then identifies the emotions during viewing on the basis of the first emotions and the second emotions. For example, the emotion identification part 433 identifies the emotions during viewing by averaging the first emotions and the second emotions. Further, the emotion identification part 433 may identify the median between the first emotions and the second emotions as the emotions during viewing. In this manner, the emotion identification part 433 can identify the emotions during viewing, which reflect the emotions experienced by the viewer when viewing the region closer to the viewer, where the color and the surface texture of the object can be recognized, and the emotions experienced by the viewer when viewing the region farther from the viewer, where the texture of the object is difficult to recognize but the color thereof can be recognized.

The region in the analysis target space closer to the viewer has a greater influence on the emotions during viewing than the region farther from the viewer, and so the emotion identification part 433 may identify the emotions during viewing by assigning greater weighting to the first emotions than to the second emotions, and averaging these emotions. In this manner, the emotion identification part 433 can assign greater weighting to the emotions of the viewer viewing the region in the analysis target space closer to the viewer than to the emotions of the viewer viewing the region in the analysis target space farther from the viewer. As a result, the emotion identification part 433 can identify the emotions during viewing, including the influence of the distance.

The emotion identification part 433 may identify the emotions during viewing on the basis of a ratio of a green-colored region in the analysis target image 6 (hereinafter referred to as "green visual ratio") and a ratio of a brown-colored region in the analysis target image 6 (hereinafter referred to as "wood visual ratio"). For example, the emotion identification part 433 identifies a higher comfort level as the green visual ratio increases from 0% to a predetermined value, and identifies a lower comfort level as the green visual ratio increases above the predetermined value. In other words, the comfort level with respect to the green visual ratio is represented by an upward convex shape graph with the predetermined value being the maximum value. It should be noted that the emotion identification part 433 may identify at least one of the comfort level or the arousal level with respect to the wood visual ratio, similar to the green visual ratio. A predetermined value of the wood visual ratio may be different from or the same as the predetermined value of the green visual ratio. In this manner, the emotion identification part 433 can identify the emotions during viewing according to a ratio of plants and a ratio of wood to the entire analysis target space.

The emotion identification part 433 identifies the emotions during viewing for one analysis target space by identifying respective emotions during viewing for the plurality of analysis target images corresponding to the one analysis target space. The one analysis target space is an indoor living room, kitchen, dining room, bedroom, or the like, for example. In this case, the image acquisition part 431 acquires a plurality of pieces of analysis target image data representing states in which the one analysis target space is viewed from different positions. In other words, the image acquisition part 431 acquires, as the analysis target image data, a plurality of captured images of the one analysis large space, which are captured from different positions or in different orientations.

Next, the image analysis part 432 identifies the hue and the texture of each region in the analysis target image corresponding to each of the pieces of analysis target image data. Subsequently, the emotion identification part 433 identifies the respective emotions during viewing for the analysis target space corresponding to the plurality of pieces of analysis target image data. Specifically, the emotion identification part 433 inputs the hue and the texture of each region of each of the pieces of analysis target image data to the first learning model, thereby identifying a plurality of emotions during viewing corresponding to each of the pieces of analysis target image data. The emotion identification part 433 then identifies the emotions during viewing corresponding to the one analysis target space, on the basis of the plurality of identified emotions during viewing. For example, the emotion identification part 433 identifies a value obtained by averaging the plurality of emotions during viewing or a median of the plurality of emotions during viewing.

Further, the emotion identification part 433 may identify the emotions during viewing corresponding to the one analysis target space by averaging the plurality of emotions during viewing after weighting each of the emotions during viewing according to the importance of the analysis target image data corresponding to those emotions during viewing. Specifically, the emotion identification part 433 assigns greater weighting to the analysis target image data representing a state of viewing the one analysis target space from a position from which the viewer frequently views than to the analysis target image data representing a state of viewing the one analysis target space from a position from which the viewer less frequently views, and then averages those pieces of analysis target image data. In this way, the emotion identification part 433 can appropriately identify the emotions experienced by the viewer when spending time in the one analysis target space.

The output part 434 outputs the information indicating the emotions during viewing in association with the analysis target image 6. For example, the output part 434 outputs information for displaying the emotions during viewing overlayed on the analysis target image 6. Specifically, the output part 434 outputs, to the viewing terminal 3, information for displaying a heat map of the comfort level of the emotions during viewing overlayed on the analysis target image.

Figure 9:
FIG. 9 shows a heat map of a comfort level overlayed on the analysis target image.
Figure 9:

FIG. 9 shows the heat map 7 of the comfort level overlayed on the analysis target image 6. Regions displayed in lighter color in FIG. 9 are regions whose comfort levels are higher than regions displayed in darker color. Regions displayed in darker color in FIG. 9 are regions whose comfort levels are lower than regions displayed in lighter color. In this way, it is easier for the user to grasp where in the analysis target space the comfort level is higher when the viewer views that analysis target space.

The output part 434 may output a radar chart representing a plurality of items indicating the emotions during viewing on a regular polygon as the information indicating the emotions during viewing. The plurality of items indicating the emotions during viewing are types of emotions, for example. The types of emotions include relaxation, concentration, satisfaction, tiredness, and productivity, for example. The output part 434 transmits information for displaying the radar chart indicating the emotions during viewing together with the analysis target image 6. In this way, the user can easily grasp the emotions of the viewer viewing the analysis target space corresponding to the analysis target image 6.

(Process for Overlaying Emotions During Viewing on Floor Map for Display)

Figure 10:
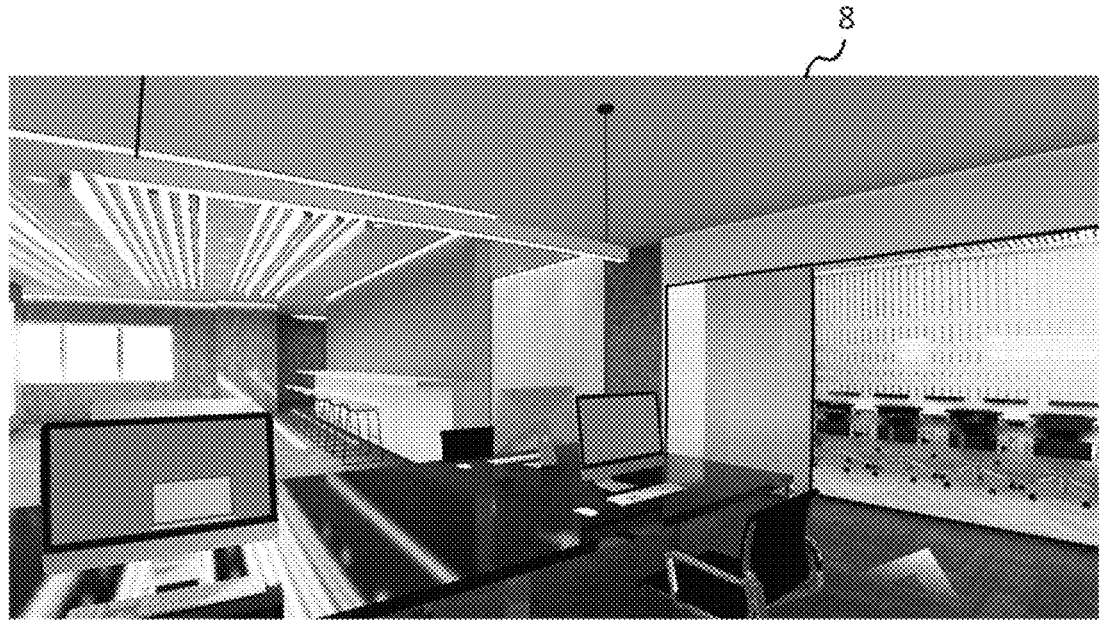
FIG. 10 is an example of the analysis target image.

The user sometimes wants to know the emotions during viewing corresponding to each of a plurality of analysis target spaces within one space. The one space is a commercial facility such as a department store or a shopping mall, or a public facility such as a hospital or a government office, for example. The plurality of analysis target spaces are, in the department store, a plurality of stores and rest areas in the department store, for example. The information processing apparatus 4 identifies the emotions during viewing for the plurality of analysis target spaces within the one space, and causes the administrator terminal 2 to display the identified emotions during viewing in association with a map of the one space (hereinafter referred to as a "floor map"). The process of displaying the emotions during viewing overlayed on the floor map will be described in detail below. The image acquisition part 431 acquires the analysis target image data corresponding to each of the plurality of analysis target spaces within the one space. For example, the image acquisition part 431 acquires, as the analysis target image data, a plurality of captured images obtained by capturing each of the plurality of analysis target spaces. Further, the image acquisition part 431 may acquire one piece of analysis target image data representing the plurality of analysis target spaces. For example, the image acquisition part 431 acquires a 360-degree image created by synthesizing a plurality of captured images of the one space, which were captured in all directions from a predetermined position, through computer-based processing. Further, the image acquisition part 431 may acquire a plurality of images obtained by dividing a 360-degree image at predetermined angles, as a plurality of pieces of analysis target image data. FIG. 10 is an example of an analysis target image 8. The analysis target image 8 in FIG. 10 corresponds to each of the plurality of analysis target spaces within the one space.

The emotion identification part 433 identifies the emotions during viewing for the analysis target space corresponding to each of the plurality of pieces of analysis target image data. Specifically, the emotion identification part 433 identifies the emotions during viewing for each of the pieces of analysis target image data by inputting the plurality of pieces of analysis target image data to the first learning model.

The output part 434 outputs, to the viewing terminal 3, information for overlaying the emotions during viewing on the floor map corresponding to the one space including the plurality of analysis target spaces corresponding to the plurality of analysis target images for display. Specifically, the output part 434 outputs, to a region in the floor map corresponding to each of the plurality of analysis target images, the information indicating the emotions during viewing corresponding to each of the plurality of analysis target images.

Figure 11:
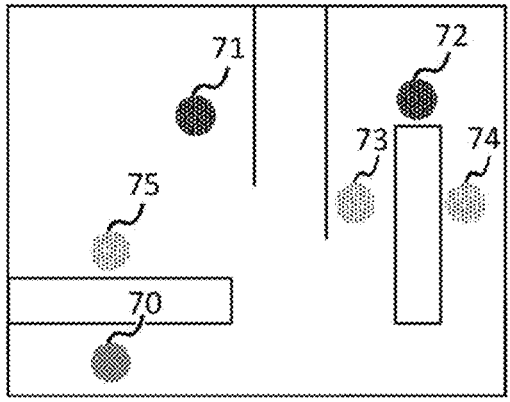
FIG. 11 is an example of a floor map having emotions during viewing overlayed thereon.

FIG. 11 is an example of the floor map having the emotions during viewing overlayed thereon. A shaded region in FIG. 11 represents the comfort level of the viewer when viewing the region, depending on the density of the shaded region. The darker the shade, the higher the comfort level. For example, the comfort levels of regions 71 and 72 are higher than those of regions 70, 73, 74 and 75. The comfort level of the region 70 is higher than those of the regions 73, 74 and 75.

In this manner, the user who views the floor map having the emotions during viewing overlayed thereon can easily grasp where in the floor the viewer feels comfort when viewing the floor. In addition, as the user can grasp where in the floor the viewer does not feel comfort when viewing the floor, the user can also use this information to improve the floor environment.

[Sequence Executed by Information Processing System S]

Figure 12:
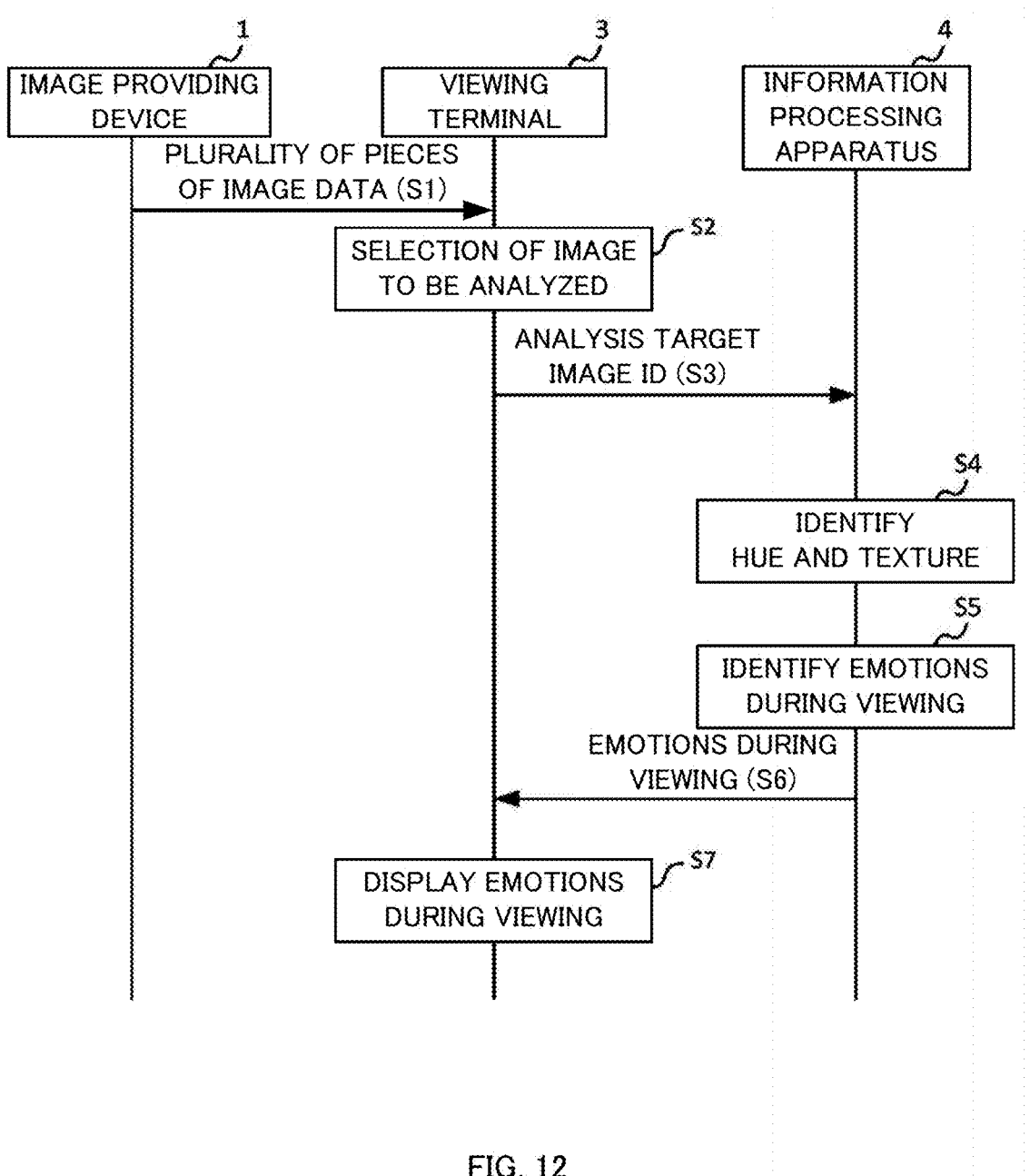
FIG. 12 is an example of a sequence executed by the information processing system.

FIG. 12 is an example of a sequence executed by the information processing system S. The sequence shown in FIG. 12 is executed when an instruction to start processing for identifying the emotions during viewing is transmitted from the viewing terminal 3, for example.

First, the image providing device 1 transmits a plurality of pieces of image data to the viewing terminal 3 that transmitted the instruction to start the processing for identifying the emotions during viewing (step S1). For example, the image providing device 1 transmits the plurality of pieces of image data of a store where products are sold, each captured from different positions or in different orientations, to the viewing terminal 3.

The viewing terminal 3 displays the plurality of images corresponding to the plurality of pieces of image data transmitted from the image providing device 1 on a display. The viewer selects which image, from among the plurality of images displayed on the viewing terminal 3, the emotions during viewing are to be identified for. The viewing terminal 3 receives selection of which of the plurality of images the emotions during viewing are to be identified for (step S2). The viewing terminal 3 transmits the analysis target image ID for identifying the analysis target image to the information processing apparatus 4 (step S3).

The information processing apparatus 4 identifies the hue and the texture of the analysis target image corresponding to the analysis target image data identified by the analysis target image ID transmitted from the viewing terminal 3 (step S4). Specifically, the information processing apparatus 4 identifies the positions of the plurality of regions of the analysis target image and the combination of the hue and the texture of each of the regions.

Subsequently, the information processing apparatus 4 identifies the emotions during viewing for the analysis target image whose hue and texture are identified (step S5). Specifically, the information processing apparatus 4 inputs i) the position of each of these regions and ii) the combination of the hue and the texture of each of these regions into the first learning model, thereby identifying the emotions during viewing for each of these regions.

The information processing apparatus 4 outputs the emotions during viewing to the viewing terminal 3 in association with the analysis target image 6 (step S6). For example, the output part 434 outputs the information for displaying the emotions during viewing overlayed on the analysis target image. Specifically, the output part 434 outputs the information for overlaying the heat map of the comfort level of the emotions during viewing on the analysis target image for display, to the viewing terminal 3.

The viewing terminal 3 displays the emotions during viewing identified by the information processing apparatus 4 on the display (step S7). Specifically, the viewing terminal 3 overlays the heat map of the comfort level of the emotions during viewing on the analysis target image for displaying on the display (see FIG. 9).

It should be noted that, in addition to transmitting the emotions during viewing to the viewing terminal 3, the information processing apparatus 4 may also display the emotions during viewing on the display of the administrator terminal 2, print them on a print medium such as paper, or transmit them to an external device (for example, the administrator terminal 2) different from the viewing terminal 3.

[Effects of Information Processing Apparatus 4]

As described above, the information processing apparatus 4 stores the first analysis data that associates i) the position of the reference space image, ii) the combination of the hue and the texture at that position, and iii) the emotion of the viewer for the reference space corresponding to that reference space image. The information processing apparatus 4 first analyzes the analysis target image data representing the state of the analysis target space to identify the hue and the texture of each region in the analysis target image represented by the analysis target image data. Next, by referring to the first analysis data, the information processing apparatus 4 identifies the emotions during viewing of the viewer for the analysis target space. Then, the information processing apparatus 4 outputs the information indicating the emotions during viewing in association with the analysis target image.

In this way, the information processing apparatus 4 can identify the viewer's emotions during viewing that are estimated to be experienced when viewing the hue and the texture of the space of the analysis target image whose degree of correlation with respect to the combination of the hue and the texture of the reference space image is equal to or above the threshold value. As a result, the information processing apparatus 4 can provide the information indicating the emotions during viewing of the viewer viewing the analysis target space represented by the analysis target image data, to the user who is a designer or an architect. Then, the user who received the emotions during viewing can grasp the emotions assumed to be experienced when the viewer views the analysis target space designed by the user, for example. Furthermore, the user will be able to design a space that allows the user to feel comfort or to concentrate, by checking the viewer's emotions during viewing for the analysis target space and changing the layout with reference to the emotions during viewing.

The present disclosure is explained on the basis of the exemplary embodiments. The technical scope of the present disclosure is not limited to the scope explained in the above embodiments and it is possible to make various changes and modifications within the scope of the disclosure. For example, all or part of the apparatus can be configured with any unit which is functionally or physically dispersed or integrated. Further, new exemplary embodiments generated by arbitrary combinations of them are included in the exemplary embodiments of the present disclosure. Further, effects of the new exemplary embodiments brought by the combinations also have the effects of the original exemplary embodiments.

15

16

What is claimed is:

1. An information processing apparatus comprising:

an image acquisition part that acquires analysis target image data representing a state of an analysis target space;

an image analysis part that identifies a hue and a texture in association with each of a plurality of regions of an analysis target image shown in the analysis target image data, by analyzing the analysis target image data;

a storage that stores first analysis data in which i) a position of a reference space image, ii) a combination of a hue and a texture at that position, and iii) emotions of a viewer for a reference space corresponding to that reference space image are associated with each other;

an emotion identification part that identifies emotions during viewing of a viewer for the analysis target space by identifying, by referring to the first analysis data, a position of the reference space image and a combination of a hue and a texture at that position whose degree of correlation with respect to a position of each of the plurality of regions identified by the image analysis part and a combination of a hue and a texture corresponding to each region is equal to or greater than a threshold value; and an output part that outputs information indicating the emotions during viewing in association with the analysis target image.

2. The information processing apparatus of claim 1, wherein a position of the reference space that a viewer is viewing and emotions of that viewer are associated with each other in the first analysis data, the emotion identification part identifies, by referring to the first analysis data, the emotions during viewing in association with the position of the analysis target space that the viewer is viewing, and the output part outputs the information indicating the emotions during viewing in association with a position of the analysis target image.

3. The information processing apparatus according to claim 1, wherein the storage further stores second analysis data in which a position in the reference space image, a hue at that position, and emotions of a viewer for the reference space image are associated with each other, and the emotion identification part i) identifies, with respect to a first region in the analysis target image, first emotions of the viewer for the analysis target image on the basis of a relationship between a position of the first region and a combination of a hue and a texture corresponding to the first region by referring to the first analysis data, ii) identifies, with respect to a second region different from the first region, second emotions of the viewer for the analysis target image on the basis of a relationship between a position of the second region and a hue corresponding to the second region, by referring to the second analysis data, and iii) identifies the emotions during viewing by averaging the first emotions and the second emotions.

4. The information processing apparatus of claim 3, wherein the analysis target image data includes depth information associated with a pixel, and the emotion identification part determines a region whose depth indicated by the depth information is less than a threshold value as the first region, and determines a region whose depth indicated by the depth information is equal to or greater than the threshold value as the second region.

5. The information processing apparatus of claim 4, wherein the emotion identification part identifies the emotions during viewing by assigning greater weighting to the first emotions than to the second emotions, and averaging the weighted first emotions and second emotions.

6. The information processing apparatus according to claim 1, wherein the emotion identification part identifies the emotions during viewing further on the basis of a ratio of a green-colored region in the analysis target image and a ratio of a brown-colored region in the analysis target image.

7. The information processing apparatus according to claim 1, wherein the image acquisition part acquires the analysis target image data corresponding to each of a plurality of the analysis target spaces, the emotion identification part identifies the emotions during viewing for the analysis target space corresponding to each of a plurality of pieces of the analysis target image data, and the output part outputs the information indicating the emotions during viewing respectively corresponding to a plurality of the analysis target images, to regions respectively corresponding to a plurality of the analysis target images of a floor map corresponding to a space including a plurality of the analysis target spaces corresponding to a plurality of the analysis target images.

8. The information processing apparatus of claim 7, wherein the output part outputs the information indicating the emotions during viewing on a region in the floor map, the region corresponding to the analysis target image for which the emotions during viewing indicates a predetermined emotion.

9. The information processing apparatus according to claim 1, wherein the image acquisition part acquires a plurality of pieces of the analysis target image data representing states where the analysis target space is viewed from different positions, and the emotion identification part identifies the emotions during viewing corresponding to the analysis target space by i) identifying the emotions during viewing for the analysis target space corresponding to each of the plurality of pieces of analysis target image data and ii) averaging a plurality of the identified emotions during viewing.

10. The information processing apparatus according to claim 1, wherein the storage stores, as the first analysis data, a machine learning model that outputs the emotions of the viewer for the reference space image, when the position in the reference space image and the combination of a hue and a texture at that position are inputted.

11. An information processing method, executed by a computer, comprising the steps of:

acquiring analysis target image data representing a state of an analysis target space;

identifying a hue and a texture in association with each of a plurality of regions of an analysis target image shown in the analysis target image data by analyzing the analysis target image data;

17 identifying emotions during viewing of a viewer for the analysis target space by identifying, in first analysis data in which a position in a reference space image, a combination of a hue and a texture at that position, and emotions of a viewer for a reference space corresponding to that reference space image are associated with each other, a position in the reference space image and a combination of a hue and a texture at that position whose degree of correlation with respect to a position of each of the plurality of regions identified and a combination of a hue and a texture corresponding to each region is equal to or greater than a threshold value; and outputting information indicating the emotions during viewing in association with the analysis target image.

12. A non-transitory storage medium storing a program for causing a computer to implement a function as:

an image acquisition part that acquires analysis target image data representing a state of an analysis target space;

an image analysis part that identifies a hue and a texture in association with each of a plurality of regions of an analysis target image shown in the analysis target image data by analyzing the analysis target image data;

an emotion identification part that identifies emotions during viewing of a viewer for the analysis target space by identifying, in first analysis data in which a position in a reference space image, a combination of a hue and a texture at that position, and emotions of a viewer for a reference space corresponding to that reference space image are associated with each other, a position in the reference space image and a combination of a hue and a texture at that position whose degree of correlation with respect to a position of each of the plurality of regions identified by the image analysis part and a combination of a hue and a texture corresponding to each region is equal to or greater than a threshold value; and an output part that outputs information indicating the emotions during viewing in association with the analysis target image.

* * * * *